United States Patent [19]

Nederpel et al.

[11] Patent Number: 5,735,595
[45] Date of Patent: Apr. 7, 1998

[54] LOW PRESSURE RARE GAS DISCHARGE LAMP SIGNALLING SYSTEM

[75] Inventors: Paulus Q. J. Nederpel; Antonius J. M. Van Hees, both of Eindhoven, Netherlands

[73] Assignee: U.S. Philips Corporation, New York, N.Y.

[21] Appl. No.: 539,920

[22] Filed: Oct. 6, 1995

[30] Foreign Application Priority Data

Oct. 26, 1994 [EP] European Pat. Off. .......... 94203103

[51] Int. Cl.⁶ .................. F21S 3/00; B60Q 1/00; B60Q 1/26; F21K 27/00
[52] U.S. Cl. .................. 362/223; 362/61; 362/80; 362/80.1; 362/263; 362/299
[58] Field of Search ................... 362/217, 223, 362/299, 327, 263, 260, 80, 80.1, 61; 315/77

[56] References Cited

U.S. PATENT DOCUMENTS

| 2,356,654 | 8/1944 | Cullman | 362/327 |
|---|---|---|---|
| 4,342,071 | 7/1982 | Chamberlain | 362/223 |
| 4,412,276 | 10/1983 | Blinow | 362/223 |
| 4,682,146 | 7/1987 | Friedmann, III | 340/77 |
| 4,774,636 | 9/1988 | Gaugel | 362/217 |
| 4,868,727 | 9/1989 | Ponds | 362/223 |
| 4,937,497 | 6/1990 | Osawa | 315/77 |
| 5,055,976 | 10/1991 | Arai | 362/223 |
| 5,161,880 | 11/1992 | Azuma | 362/223 |
| 5,195,814 | 3/1993 | Hasushita et al. | 362/223 |
| 5,432,690 | 7/1995 | Van Der Vliet | 362/217 |
| 5,510,964 | 4/1996 | Spitler | 362/217 |
| 5,539,622 | 7/1996 | Ishikawa | 362/299 |
| 5,565,741 | 10/1996 | Jennato | 315/77 |
| 5,584,572 | 12/1996 | Ishikawa | 362/223 |

FOREIGN PATENT DOCUMENTS

0562679A1  9/1993  European Pat. Off. ......... H01J 61/09

*Primary Examiner*—Ira S. Lazarus
*Assistant Examiner*—Matthew Spark
*Attorney, Agent, or Firm*—Walter M. Egbert

[57] ABSTRACT

The signaling system contains a low-pressure rare gas discharge lamp having a tubular lamp vessel provided with electrodes. The lamp is accommodated in a housing having a light-emission window and light-reflecting means. The housing has a light-reflecting inner surface reflect light and an elongate converging lens, closing the light-emission window. The housing may have a niche in which the lamp is partially recessed countersunk and in which the lamp may be secured by an adhesive.

13 Claims, 3 Drawing Sheets

LOW PRESSURE RARE GAS DISCHARGE LAMP SIGNALLING SYSTEM

BACKGROUND OF THE INVENTION

1. Field of the Invention

The invention relates to a signaling system having a low-pressure rare gas discharge lamp with a tubular lamp vessel whose end portions each accommodate a respective electrode. The signaling system also includes a housing provided with a light emission window and with light-reflecting means, in which housing the low-pressure rare gas discharge lamp is accommodated.

2. Description of Related Art

A signaling system is known from U.S. Pat. No. 4,682, 146. The known system is suitable for use as a brake light, for example placed in a comparatively high position, on motor vehicles. Alternatively it may serve, for example, as a tail light or for indicating intended changes in direction.

The system has an electrically conductive reflector in the housing. It may be applied against or recessed in the rear of a motor vehicle, or may be mounted inside such a vehicle, for example behind the rear window. A disadvantage of the known system here is that it is comparatively voluminous. It is stated that its dimensions transverse to the tubular lamp vessel are 2×2 inch² (approximately 5×5 cm²). Owing to its comparatively great height, the system when mounted behind a rear window blocks out comparatively much of the view through the rearview mirror. When mounted to the rear of a vehicle, the system renders it desirable to make windows in the car bodywork for countersinking the system therein because of its comparatively great depth.

Another disadvantage of the known system is that two parallel dark stripes are visible in the light emission window, formed by the lamp vessel wall on either side of the discharge of the neon/argon-filled lamp. Accordingly, the system does not have a homogeneous brightness during operation.

A low-pressure rare gas discharge lamp is known from EP-A 0 562 679 which is suitable for use in the signaling system. The lamp has tubular electrodes and a filling of, for example, neon, neon/helium, or xenon, possibly xenon with a coating of fluorescent material such as, for example, willemite. The lamp may have an internal diameter of, for example, 1.5 mm(0.08 in.) to 7 mm (0.28 in.), for example 3.5 mm±1.5 mm (0.14±0.06 in.).

In EP Application 94 202 708.7 of earlier date, such a low-pressure rare gas discharge lamp is described in which a tube coated with electron emitter and open at both ends is present in front of each of the tubular electrodes. The tube is connected to the associated electrode by an electrically conducting unit. The unit therein forms a heat resistance between the tube and the electrode.

SUMMARY OF THE INVENTION

It is an object of the invention to provide a signaling system of the kind described in the opening paragraph which is of a simple construction, which renders possible a slimmer design, and which supplies a homogeneous brightness, luminance, during operation.

According to the invention, this object is achieved in that the housing has an inner surface which is reflecting so as to form light-reflecting means, and an elongate converging lens having a focal line. The lens coincides with the lamp and closes off the light emission window.

The light-reflecting means are integral with the housing. A comparatively high reflectivity, a low absorption, is useful for sending as much light hitting the reflecting means as possible to the light emission window; however for lamps without fluorescent walls, a high mirroring power is not necessary. The system according to the invention having a housing of only a few centimeters high, for example 2 to 3 cm (0.8 to 1.2 in.), improves on the brightness realized with use of conventional systems having incandescent lamps.

It is favorable when the housing has an elongate niche, in which the lamp is partly recessed, opposite the light emission window. The light emission window, and thus the housing, may then have an even smaller height. It is advantageous when the niche and the lamp vessel have substantially the same curvature. Radiation hitting the niche wall is then substantially perpendicularly incident on this wall and is reflected back to the lamp for the major part along the same path. In addition, this embodiment offers the possibility of fastening the lamp in the niche with an adhesive. A correct position of the lamp relative to the lens is easy to realize in this way. Alternatively, however, the lamp may be held in the housing, for example, in clamps.

The inner surface of the housing may be mirroring, inside the niche or entirely, for example in that a metal film or an interference film has been vapor-deposited. This is favorable when the lamp radiates light from its surface only, such as is the case when the lamp vessel is provided with a fluorescent material, for example is coated with a fluorescent powder, for example a lamp with a xenon filling and zinc silicate activated by manganese (willemite). If the lamp radiates from its entire volume, as is the case with a non-fluorescent lamp having a filling of, for example, xenon, neon, or neon/argon, a favorable embodiment of the housing has a diffusely reflecting inner surface, for example obtained by using a paint, for example, a white or grey paint or a paint having the color of the generated light or of surroundings of the housing. Alternatively, the housing may be of a synthetic resin which is colored through-and-through. Alternatively again, the housing may be of metal, for example in the case of an AC-operated lamp.

It was found that the shape of the reflecting inner surface is not particularly critical in a diffusely reflecting version thereof. The Surface may be circularly or parabolically curved, for example remote from the light emission window in cross-section, and may widen linearly near the light emission window in a direction towards said window. Alternatively, however, it may be entirely parabolically curved, possibly away from a niche. This shape is also favorable for a mirroring reflecting surface.

It is advantageous when the lamp vessel has a small diameter, for example an inner diameter of 2.5±0.5 mm (0.01±0.02 in.). The lamp then has a higher luminance than if the internal diameter were greater, which further increases the luminous flux in the beam generated by the system.

In a favorable embodiment, the lens is parabolically curved in cross-sections at its outer surface. The inner surface may be, for example, convexly circularly curved in said cross-sections. It is favorable for a low-reflectivity on the inner surface of the lens when the lens has fringe zones on its inner surface on either side of a central, convex circularly curved zone, which fringe zones together lie in a flat plane or which, more in particular, are concave with a comparatively small circular curvature, a comparatively great radius of curvature. These fringe zones also contribute to spreading of the light in the beam in directions which enclose a small angle of a few degrees with the centerline of the beam.

The lens may be made of glass or synthetic resin and may be colorless, or have the color of the light to be radiated, or have the color of its surroundings, for example, the color of the bodywork of a motor vehicle.

BRIEF DESCRIPTION OF THE DRAWING

Embodiments of the signaling system according to the invention are shown in the drawing, in which.

DESCRIPTION OF THE PREFERRED EMBODIMENTS

Figure 1:
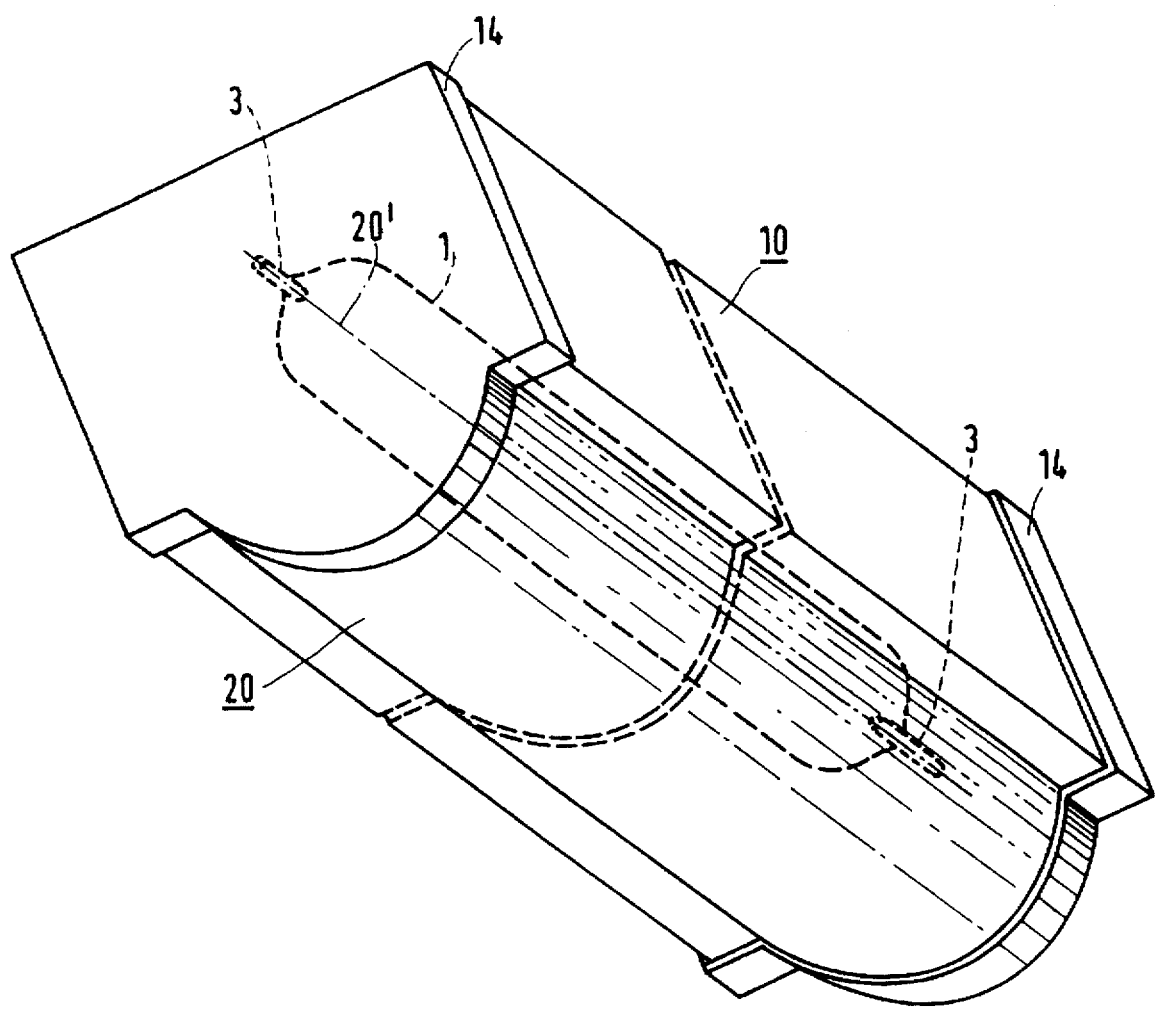
FIG. 1 is a perspective view of a first embodiment.
Figure 2:
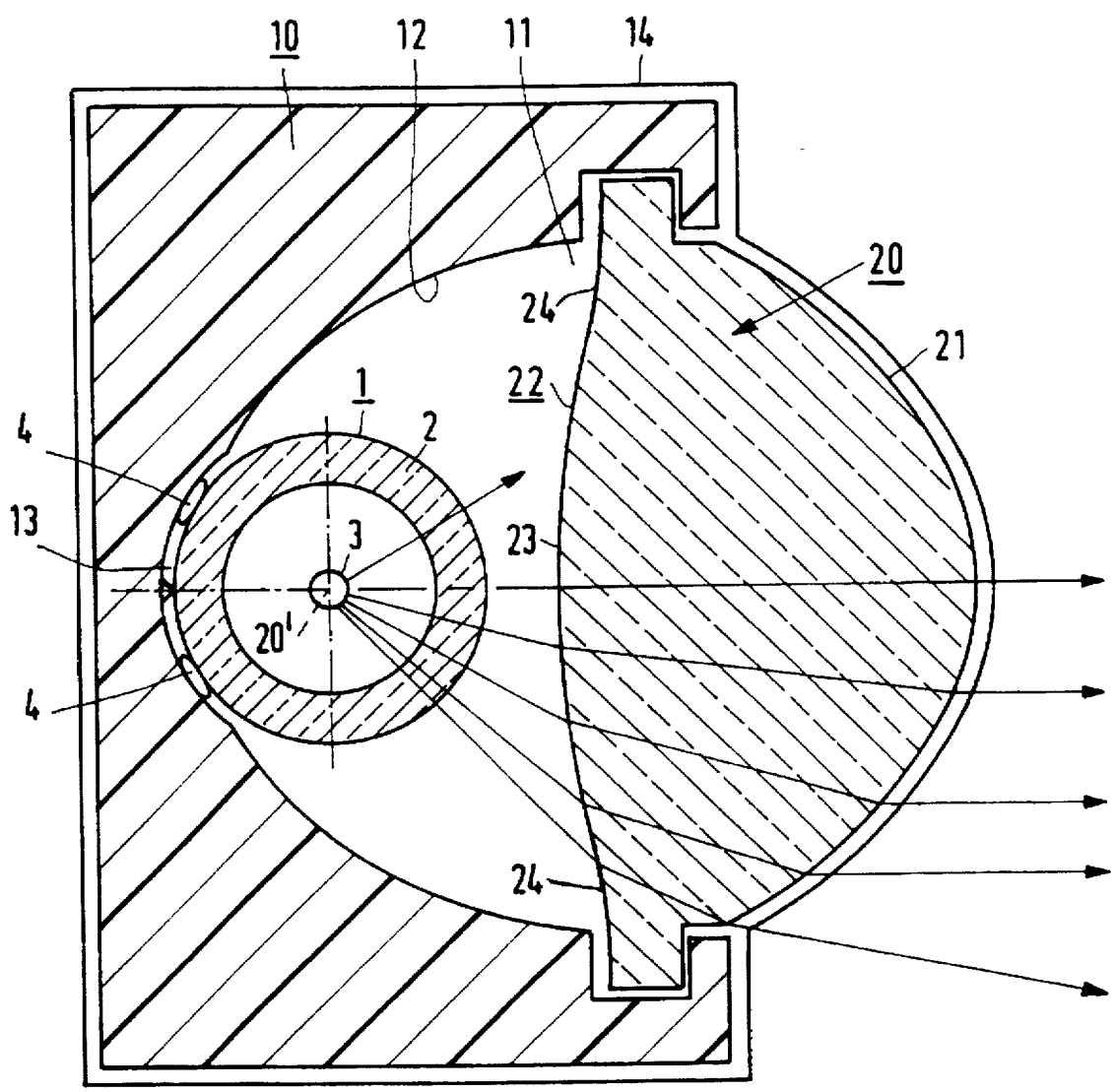
FIG. 2 is a cross-section through FIG. 1 on an enlarged scale.

In FIGS. 1 and 2, the signaling system includes a low-pressure rare gas discharge lamp 1 with a tubular lamp vessel 2 whose end portions each accommodate a respective electrode 3. The lamp is held in a housing 10 provided with a light emission window 11 and light-reflecting means 12.

The housing has an inner surface which is reflecting so as to form the light-reflecting means 12. The housing further has an elongate converging lens 20 with a focal line 20' which coincides with the lamp 1. The lens closes off the light emission window 11.

In the embodiment shown, the housing is made of white polymethyl methacrylate, the lens of transparent polymethyl methacrylate, so that the inner surface of the housing 1 is diffusely reflecting. In a modification, the housing is also made of transparent polymethyl methacrylate which is painted internally white and externally a dull black. The housing is closed off with a plastic cap 14 at either end.

The housing 10 has an elongate niche 13, in which the lamp 1 is partly recessed, opposite the light emission window 11. The niche 13 and the lamp vessel 2 substantially have the same curvature.

The lamp 1 is fastened in the niche 13 in a few spots with an adhesive 4.

The lamp vessel 2 of the lamp shown has an internal diameter of 2.5±0.5 mm (0.1±0.02 in.), and a wall thickness of approximately 0.6 mm (0.02 in.).

The lens 20 shown has a substantially parabolically curved outer surface 21 in cross-section. Its inner surface 22 is substantially convexly circularly curved in cross-section. The inner surface 22 of the lens has concave fringe zones 24 of comparatively small circular curvature in cross-sections on either side of a central zone 23.

The lamp has a length of approximately 40 cm (15.7 in.) and a filling of 25 mbar (0.025 atm) neon. Operated with a DC-voltage, the lamp carries a current of approximately 8 mA at rated power.

In the embodiment shown, the outer surface of the lens is curved in accordance with $y^2=5.56 \times [mm^2]$, the inner surface of the central zone is convex through an angle of 27° measured from the center of curvature, with a radius of 10 mm (0.39 in.), and concave in the fringe zones with a radius of 6 mm (0.2 in.). Outside the niche, the housing is curved in cross-sections in accordance with circular arcs having a radius of 5 mm (0.2 in.). The light emission window has dimensions of 390 * 8 $mm^2$ (15.4 * 0.31 $in^2$), so that the housing is no bigger than 420 * 11 * 10 $mm^3$ (16.5 * 0.43 * 0.4 $in^3$).

Figure 3:
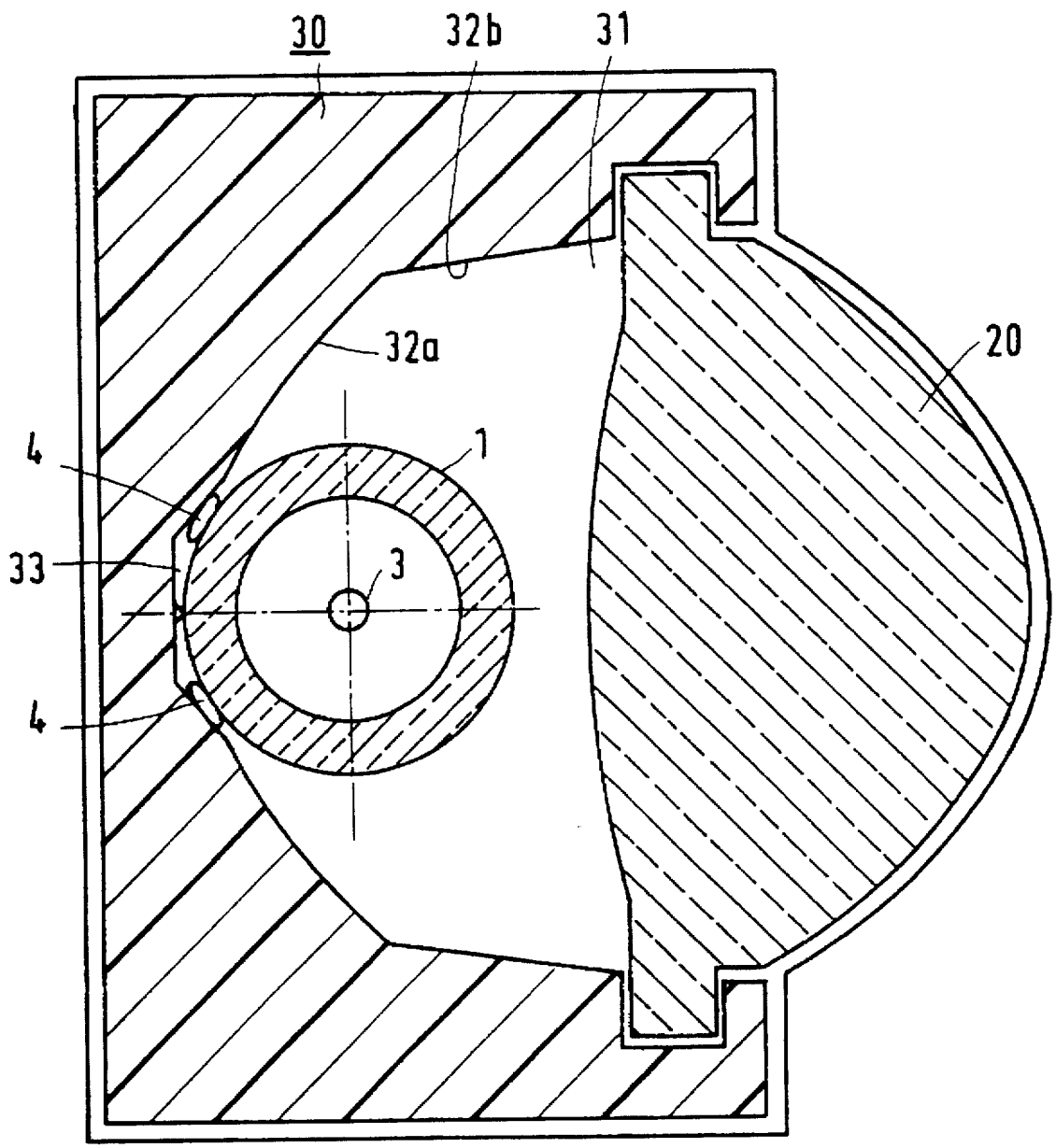
FIG. 3 is a cross-section of an alternative embodiment.

A same lens 20 is used in the embodiment of FIG. 3. Same numerals represent same elements as in prior Figures. The housing 30 has a trapezium shape internally in cross-sections at the area of the niche 33, and adjoining thereto has a parabolic inner surface 32a, upon which its inner surface 32b widens linearly up to the light emission window 31. An identical lamp 1 is mounted therein.

The photometric properties of the system of FIGS. 1 and 2 were measured and compared with the European requirements set for a central, high brake light on motor vehicles. The results are listed in Table 1.

TABLE 1

| dir | | req ≧ [cd] (ECE R7 Cat. | |
|---|---|---|---|
| vert [°] | hor [°] | S3a) | syst [cd] |
| 10 U | 10 L | 8 | 42 |
| 10 U | 0 | 16 | 44 |
| 10 U | 10 R | 8 | 42 |
| 5 U | 10 L | 16 | 65 |
| 5 U | 5 L | 25 | 65 |
| 5 U | 0 | 25 | 65 |
| 5 U | 5 R | 25 | 65 |
| 5 U | 10 R | 16 | 65 |
| 0 | 10 L | 16 | 77 |
| 0 | 5 L | 25 | 76 |
| 0 | 0 | 25 | 76 |
| 0 | 5 R | 25 | 76 |
| 0 | 10 R | 16 | 77 |
| 5 D | 10 L | 16 | 65 |
| 5 D | 5 L | 25 | 65 |
| 5 D | 0 | 25 | 65 |
| 5 D | 5 R | 25 | 65 |
| 5 D | 10 R | 16 | 65 | dir: direction from lamp center
hor: horizontal
vert: vertical
U: upward
D: downward
L: to the left
R: to the right
req: requirement
syst: system It is apparent from Table 1 that the system easily exceeds the requirements in spite of its small height and depth. The system has an even luminance. Dark stripes are effectively counteracted.

We claim:

1. A signalling system, comprising:

a low-pressure rare gas discharge lamp with a tubular lamp vessel whose end portions each accommodate a respective electrode, said electrodes defining a lamp axis on which gas discharge is maintained during lamp operation;

a housing provided with a light emission window and with light-reflecting means, in which housing the low-pressure rare gas discharge lamp is accommodated, said housing having an elongate niche opposite the light emission window, in which the lamp is partly recessed, said light reflecting means for reflecting light, said light-reflecting means being comprised by an inner reflective surface of said housing; and an elongate converging lens having a focal line which substantially coincides with the lamp axis and closes off the light emission window.

wherein the inner surface of the housing is diffusely reflecting.

2. A signalling system as claimed in claim 1, wherein the niche and the lamp vessel have substantially the same curvature.

3. A signalling system as claimed in claim 2, wherein the lamp is fastened in the niche with an adhesive.

4. A signalling system as claimed in claim 1, wherein the lamp vessel has an inner diameter of 2.5±0.5 mm.

5. A signalling system as claimed in claim 1, wherein the lens has an outer surface which is substantially parabolically curved in cross-section.

6. A signalling system as claimed in claim 5, wherein the lens has an inner surface which is substantially curved into a convex circle in cross-section.

7. A signalling system as claimed in claim 6, wherein the inner surface of the lens has fringe zones of a comparatively small concave circular curvature on either side of a central zone in cross-sections.

8. A signalling system, comprising:
- a low-pressure rare gas discharge lamp with a tubular lamp vessel whose end portions each accommodate a respective electrode, said electrodes defining a lamp axis on which gas discharge is maintained during lamp operation;
- a housing provided with a light emission window and with light-reflecting means, in which housing the low-pressure rare gas discharge lamp is accommodated, said light reflecting means for reflecting light, said light-reflecting means being comprised by an inner reflective surface of said housing; and
- an elongate converging lens having a focal line which substantially coincides with the lamp axis and closes off the light emission window.

wherein the inner surface of the housing is diffusely reflecting.

9. A signalling system as claimed in claim 8, wherein the lamp vessel has an inner diameter of 2.5±0.5 mm.

10. A signalling system as claimed in claim 8, wherein the lens has an outer surface which is substantially parabolically curved in cross-section.

11. A signalling system as claimed in claim 10, the lens has an inner surface which is substantially curved into a convex circle in cross-section.

12. A signalling system as claimed in claim 11, wherein the inner surface of the lens has fringe zones of a comparatively small concave circular curvature on either side of a central zone in cross-sections.

13. A signalling system as claimed in claim 8, wherein the lamp is fastened in the niche with an adhesive.

* * * * *